(12) United States Patent
Miyakawa et al.

(10) Patent No.: US 8,932,503 B2
(45) Date of Patent: Jan. 13, 2015

(54) MOLD STRUCTURE FOR MOLDING HOUSING, METHOD FOR MOLDING HOUSING, AND HOUSING

(75) Inventors: Tomoyuki Miyakawa, Utsunomiya (JP); Kazuto Ohtaka, Makinohara (JP); Hideki Homma, Tokyo (JP); Yoshinori Yamanashi, Makinohara (JP)

(73) Assignee: Yazaki Corporation, Tokyo (JP)

( * ) Notice: Subject to any disclaimer, the term of this patent is extended or adjusted under 35 U.S.C. 154(b) by 577 days.

(21) Appl. No.: 13/369,932

(22) Filed: Feb. 9, 2012

(65) Prior Publication Data

US 2012/0139161 A1 Jun. 7, 2012

Related U.S. Application Data

(62) Division of application No. 12/763,475, filed on Apr. 20, 2010, now Pat. No. 8,430,662.

(30) Foreign Application Priority Data

Apr. 23, 2009 (JP) ................................ P2009-105189

(51) Int. Cl.
*B29C 45/44* (2006.01)
*H01R 43/18* (2006.01)
*H01R 13/422* (2006.01)

(52) U.S. Cl.
CPC ........ *B29C 45/4407* (2013.01); *H01R 13/4223* (2013.01); *H01R 43/18* (2013.01)

USPC ............................................ 264/318; 425/330

(58) Field of Classification Search
CPC ............................ B29C 45/4407; H01R 43/18
USPC ............................................ 264/318; 425/330
See application file for complete search history.

(56) References Cited

FOREIGN PATENT DOCUMENTS

DE 102007010835 A1 9/2008
JP 2006-196214 A 7/2006

OTHER PUBLICATIONS

Office Action issued on Dec. 8, 2011 in the corresponding German Patent Application No. 102010017942.6.

*Primary Examiner* — Yogendra Gupta
*Assistant Examiner* — Alison Hindenlang
(74) *Attorney, Agent, or Firm* — Sughrue Mion, PLLC

(57) ABSTRACT

A mold for forming a housing having a lance includes a first mold and a second mold. The lance has a first projection for engaging a terminal and a second projection provided at a position nearer with an end of the lance than the first projection. The first mold includes a first member having a third projection. The second mold includes a second member and a third member. The second member has a first concave portion into which the third projection is inserted. The third member is configured to be moved with respect to the second member. The second member defines, with the first member, a first space where the housing is adapted to be formed. The third member defines, with the first member, a second space where the first projection and the second projection are adapted to be formed.

2 Claims, 13 Drawing Sheets

MOLD STRUCTURE FOR MOLDING HOUSING, METHOD FOR MOLDING HOUSING, AND HOUSING

This application is a divisional application of U.S. patent application Ser. No. 12/763,475, filed Apr. 20, 2010, which claims priority from Japanese Patent Application P2009-105189, filed Apr. 23, 2009, the entire disclosure is incorporated herein by reference.

BACKGROUND

The present invention relates to a mold structure to be used for molding a housing such as a connector housing, a molding method, and the housing molded.

The connector housing has a locking lance for locking a terminal in a terminal containing room, and is molded of resin by injection molding. A method of molding this connector housing is disclosed in Patent Document 1.

In this method, a core member for molding the locking lance is provided in one of a pair of molds which move relative to each other in a mold clamping direction. The core member includes a first core, and a second core which is provided in the first core and can move back and forth relative to the first core. In a state where the first core and the second core are aligned in parallel, a groove part for molding the locking lance is formed. The first core and the second core are arranged in parallel in a lateral direction of the locking lance.

In this molding method, resin material is filled in a clamped state of a pair of the molds thereby to mold the locking lance having flexibility in the aforesaid groove part, and when the molds are opened after solidification of the resin material, the second core is moved in a mold extracting direction. With this movement, the locking lance is flexed to be removed from the groove part, and an entirety of the connector housing is separated from the mold so that the connector housing is molded.

In the above described method, the locking lance is not forcibly extracted when it is removed, and therefore, the locking lance will not be broken.

[Patent Document 1] Japanese Patent Publication No. 2006-196214 A

In the molds to be used in the above described method, the core is divided into the first core and the second core which are arranged in parallel in the lateral direction of the locking lance. For this reason, in case where the locking lance having a small width is molded, the first core and the second core become further smaller, and rigidity of the core cannot be secured.

Moreover, on occasion of molding the locking lance, a groove where the second core moves in the mold extracting direction is formed in the lateral direction of the locking lance. Because this groove is formed, a locking area for locking the locking lance to a terminal becomes smaller. For this reason, there is a problem that terminal holding force of the locking lance cannot be sufficiently secured.

SUMMARY

It is therefore one advantageous aspect of the present invention is to provide a mold structure for molding a housing capable of molding a locking lance whose terminal holding force can be sufficiently secured, without deteriorating rigidity of a core for molding the locking lance, a molding method, and the housing.

According to one aspect of the invention, there is provided a mold for forming a housing having a lance, the lance having a first projection for engaging a terminal and a second projection provided at a position nearer with an end of the lance than the first projection, comprising:

a first mold including a first member having a third projection; and a second mold including:
a second member having a first concave portion into which the third projection is inserted; and
a third member configured to be moved with respect to the second member, wherein the second member defines, with the first member, a first space where the housing is adapted to be formed, wherein the third member defines, with the first member, a second space where the first projection and the second projection are adapted to be formed.

The mold may be configured such that the third member has a first part configured to form the first projection with the first member and a second part configured to form the second projection with the first member.

The mold may be configured such that: the second part is a concave part, a shape of the concave part in a cross section is triangular, the cross section defined by a direction in which the lance is elongated and a direction in which the second projection is projected from the lance.

According to another aspect of the invention, there is provided a method for molding a housing having a lance, the lance having a first projection for engaging a terminal and a second projection provided at a position nearer with an end of the lance than the first projection, comprising:

providing a mold including:
a first mold including a first member having a third projection; and
a second mold including:
a second member having a first concave portion into which the third projection is inserted; and
a third member configured to be moved with respect to the second member,
wherein the second member defines, with the first member, a first space where the housing is adapted to be formed,
wherein the third member defines, with the first member, a second space where the first projection and the second projection are adapted to be formed;

filling a material between the first mold and the second mold;

dividing the first mold and the second mold;

displacing the third member with respect to the second member, so that the lance is bent, by urged from the third member at the second projection, into a space where the third projection of the first member has occupied before the dividing; and separating the housing from the second member in a state that the lance is bent into the space.

The method may be configured such that: the third member has a first part configured to form the first projection with the first member and a second part configured to form the second projection with the first member, when the third member is displaced with respect to the second member, the second part urges the second projection so that the first part is allowed to be separated from the first projection.

According to one aspect of the invention, there is provided a housing for holding a wire, comprising:

a body having an accommodating chamber configured to accommodate a terminal; and a lance provided in the accommodating chamber, configured to prevent the terminal from disengaging with the housing and including:
an arm portion extended from the body;

a first projection provided in the arm portion and configured to engage with the terminal; and a second projection provided in the arm portion at a position nearer to an end of the arm portion than the first projection.

DETAILED DESCRIPTION OF EXEMPLIFIED EMBODIMENTS

Figure 1:
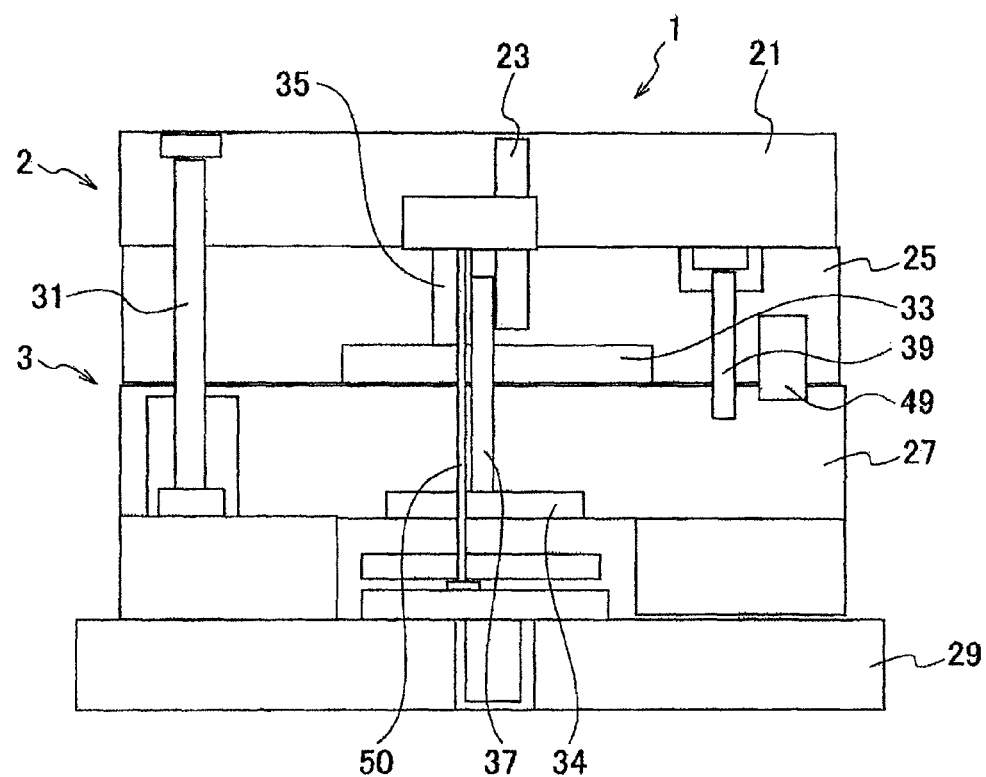
FIG. 1 is a sectional view showing a mold structure in an embodiment according to the invention, in a clamped state.

Now, the invention will be specifically described referring to an embodiment as shown in the drawings.

As shown in FIGS. 1 to 4, a mold structure 1 in this embodiment includes a fixed mold 2 as one of molds, and a movable mold 3 as the other mold. A cavity is formed between the fixed mold 2 and the movable mold 3 when these molds are clamped, and by filling resin in this cavity, a housing 5 is molded.

As shown in FIGS. 9 to 13, a housing 5 has a housing body 7, and a wire end holding part 9 which is integrally molded with the housing body 7. The housing body 7 is provided with a plurality of terminal containing rooms 12 for respectively containing terminals 11 which are connected to terminal end portions of electric wires 13. A locking lance 15 which is locked to the terminal 11 for preventing a withdrawal of the terminal 11 is formed in each of the terminal containing rooms 12. The locking lance 15 has a flexible arm 16 which is extended from the housing body 7. The flexible arm 16 is provided with a terminal locking projection 17 to which the terminal 11 is locked, and a lance displacing projection 18 more close to a free end side of the flexible arm 16 than the terminal locking projection 17 (See FIGS. 11, 12, and 13).

As shown in FIGS. 1 to 4, the fixed mold 2 includes a fixed mold plate 21, and a first core member 23 which is fixed to the fixed mold plate 21.

The movable mold 3 has a movable mold plate 25 corresponding to the fixed mold plate 21, a movable back plate 27 for supporting the movable mold plate 25, and a movable holding plate 29 for supporting the movable back plate 27. The movable mold plate 25 is coupled to the fixed mold plate 21 by means of a puller rod 31. A second core member pressing plate 33 is fitted to the movable mold plate 25, and a second core member 35 is fixed to the second core member pressing plate 33. A third core member pressing plate 34 is fixed to the movable back plate 27, and a third core member 37 is fixed to the movable back plate 27 and the third core member pressing plate 34. The movable back plate 27 and the movable mold plate 25 are coupled to each other by means of a shoulder bolt 39 so that the movable back plate 27 can be separated from the movable mold plate 25 by means of the shoulder bolt 39.

As shown in FIGS. 5 to 8, the terminal containing room 12 of the housing 5 and the flexible arm 16 of the locking lance 15 are molded in a space between the first core member 23 and the second core member 35. The terminal locking projection 17 and the lance displacing projection 18 are molded between the third core member 37 and the first core member 23.

The second core member 35 is formed with a lance flexing space 41 in which the locking lance 15 can be displaced. The lance flexing space 41 is formed at a position behind the lance displacing projection 18 of the locking lance 15. On the other hand, the first core member 23 is formed with a lance flexing space insertion part 43 which is adapted to be inserted into the lance flexing space 41 at a time of molding. By inserting the lance flexing space insertion part 43 into the lance flexing space 41, the resin will not intrude into this space.

In this embodiment, as shown in FIGS. 5 to 8 and 11, the lance displacing projection 18 of the locking lance 15 is formed at a position adjacent to the terminal locking projection 17 at the same side. As shown in FIGS. 5 to 8, the third core member 37 for forming the terminal locking projection 17 and the lance displacing projection 18 is provided with a locking projection molding part 45 for molding the terminal locking projection 17, and a lance displacing projection molding part 47.

The locking projection molding part 45 has a flat-shaped tip end face so that a face of the terminal locking projection 17 which is locked to the terminal 11 is molded to be flat. [0032]

Figure 7:
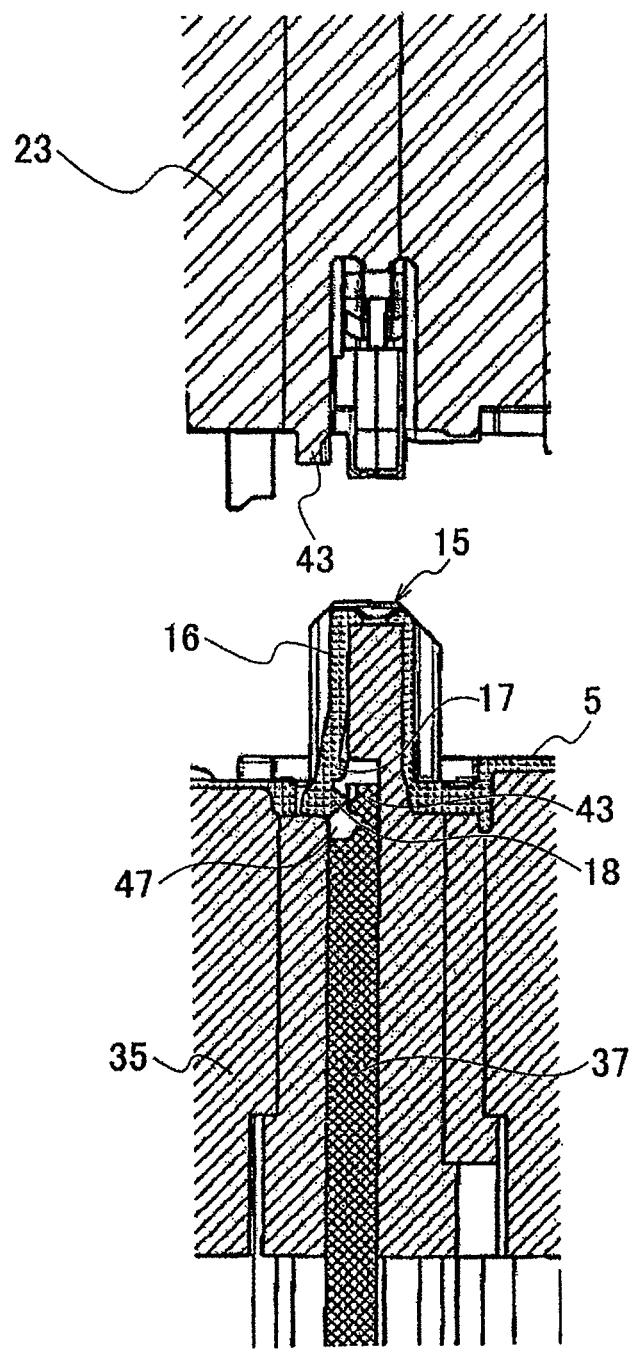
FIG. 7 is a sectional view showing the open state continued from FIG. 6, in which the locking lance is flexed.
Figure 8:
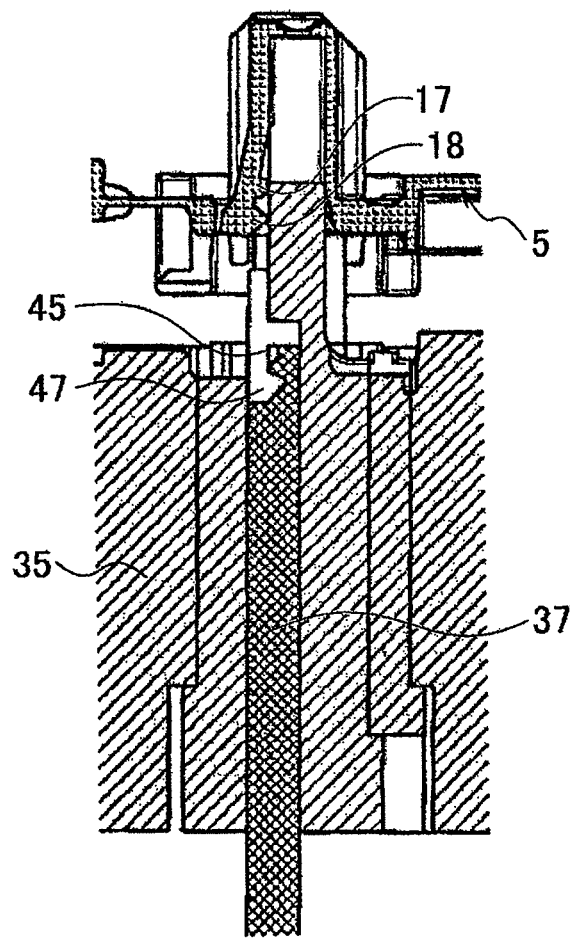
FIG. 8 is a sectional view showing a state where the molded housing is being extruded.
Figure 9:
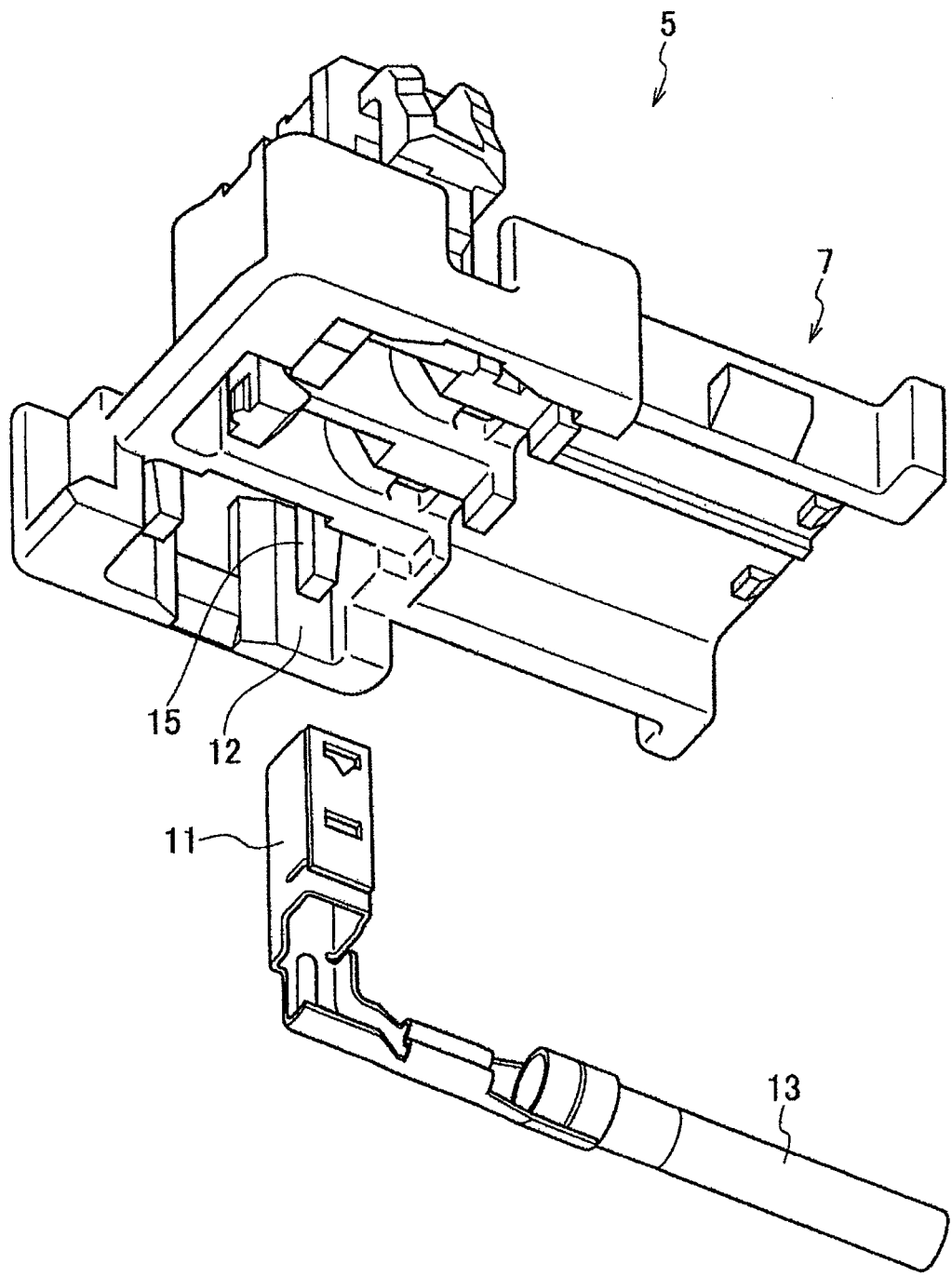
FIG. 9 is a perspective view of the housing, in an embodiment of the invention.

As shown in FIGS. 7 and 8, the lance displacing projection molding part 47 is formed as a recess having a triangular shape in section, and provided with taper faces which are inclined in the mold extracting direction, at upper and lower positions thereof. Accordingly, the lance displacing projection 18 is molded in a triangular shape in section having taper faces which are inclined in the mold extracting direction at the upper and lower positions.

Because the molds are designed in such relation, by moving the second core member 35 relative to the third core member 37 in the mold extracting direction (in an upward direction in FIG. 7), the taper faces of the lance displacing projection molding part 47 press the lance displacing projection 18. With this pressing operation, a free end side of the locking lance 15 including the lance displacing projection 18 is flexed outward to be displaced toward the lance flexing space 41. Consequently, the lance displacing projection 18 is separated from the lance displacing projection molding part 47. Because the lance displacing projection 18 is displaced toward the lance flexing space 41 in this manner, the locking projection molding part 45 of the third core member 37 is separated from the terminal locking projection 17. Accordingly, the free end side of the locking lance 15 comes into a state separated from the third core member 37.

Now, molding operation of the housing 5 according to the embodiment will be described.

As shown in FIG. 1, in a state where the fixed mold 2 and the movable mold 3 have been clamped, the resin is injected into the cavity between them. By injecting the resin, the terminal containing room 12 is formed between the first core member 23 and the second core member 35. In the clamped state, the lance flexing space insertion part 43 of the first core member 23 intrudes into the lance flexing space 41 in the second core member 35, and the lance flexing space 41 is closed. In this state, the flexible arm 16 is molded between the first core member 23 and the third core member 37, the terminal locking projection 17 is molded between the locking projection molding part 45 of the third core member 37 and the first core member 23, and the lance displacing projection 18 is molded between the lance displacing projection molding part 47 of the third core member 37 and the first core 23.

Figure 2:
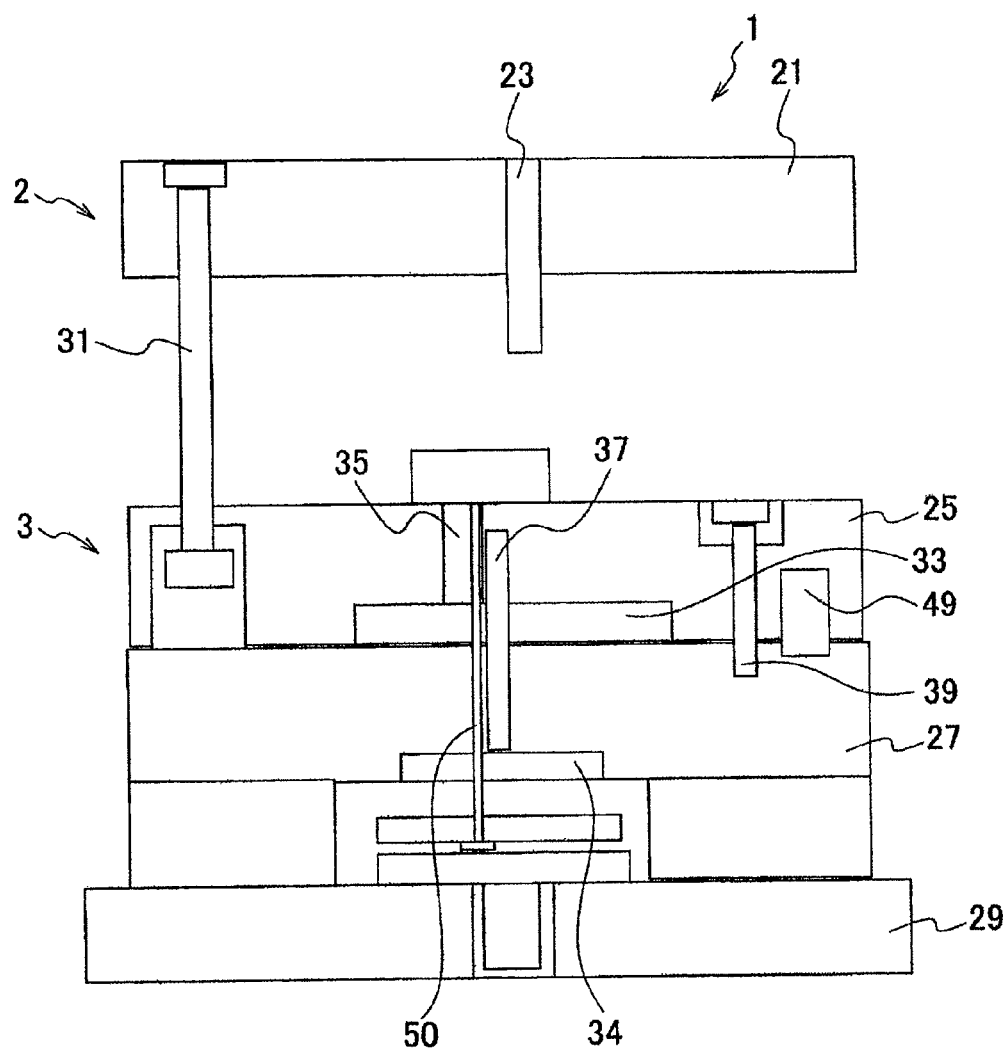
FIG. 2 is a sectional view showing the mold structure in an open state.
Figure 6:
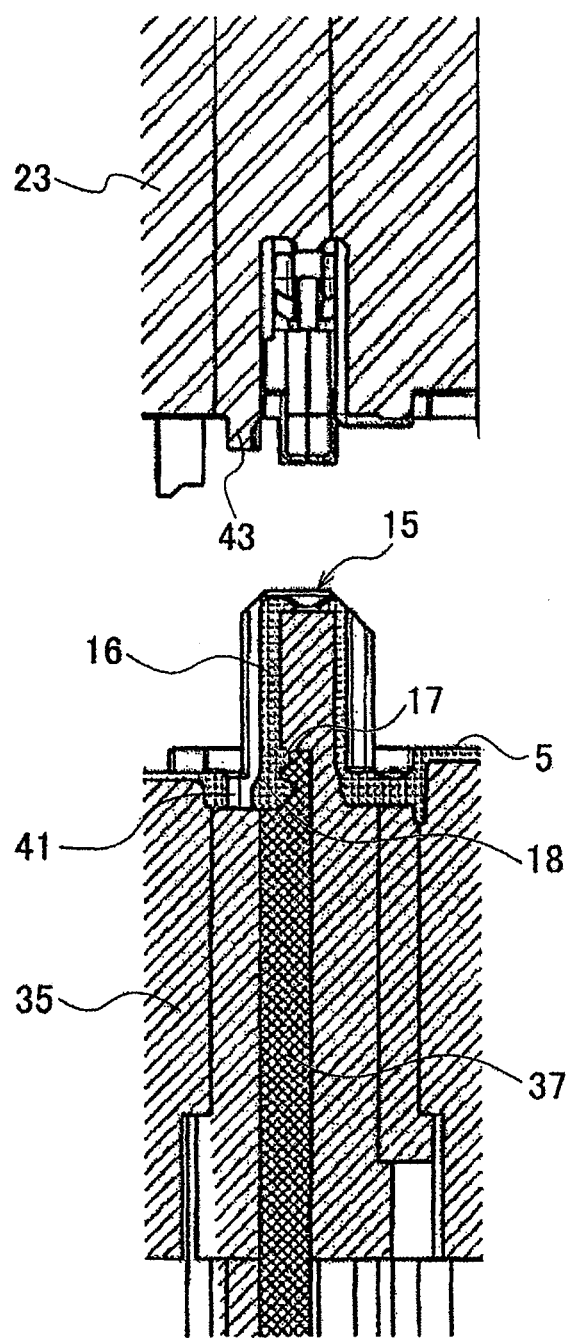
FIG. 6 is a sectional view showing the open state continued from FIG. 5.

FIG. 2 shows a state where the molds are opened, after the resin has been hardened. The fixed mold 2 (the fixed mold plate 21) moves with respect to the movable mold 3 (the movable mold plate 25) in the mold extracting direction. With this movement, the lance flexing space insertion part 43 of the first core member 23 is separated from the lance flexing space 41 in the second core member 35, as shown in FIG. 6. Accordingly, the lance flexing space 41 is opened in the second core member 35 at a back side of the terminal locking projection 17 and the lance displacing projection 18. It is to be noted that in the state as shown in FIG. 2, the movable mold plate 25 and the movable back plate 27 are closed by means of the lock member 49.

Figure 3:
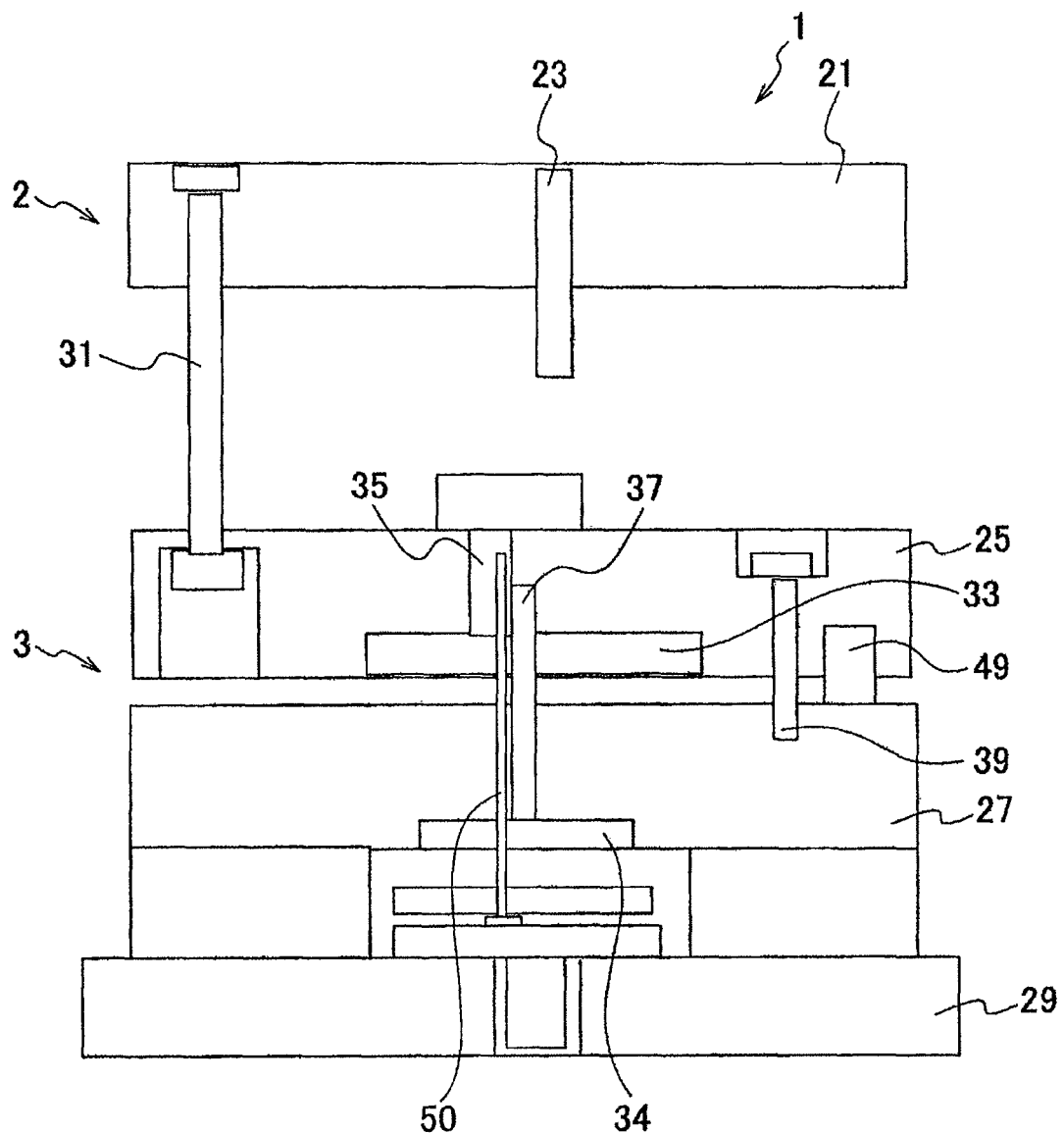
FIG. 3 is a sectional view showing the mold structure in the open state continued from FIG. 2.

FIG. 3 shows a state where the molds are opened, continued from FIG. 2. As the molds continue to be opened, the puller rod 31 pulls up the movable mold plate 25 in the mold extracting direction, whereby the movable mold plate 25 is separated from the movable back plate 27. Accordingly, the second core member 35 moves in the mold extracting direction. On the other hand, the third core member 37 stays at a fixed position, because it is fixed to the movable back place 27. Therefore, the second core member 35 moves relative to the third core member 37 in the mold extracting direction (upward direction).

FIG. 7 shows the state corresponding to FIG. 3. With the relative movement of the second core member 35 in the upward direction, the whole locking lance 15 is moved relative to the third core member 37 in the same direction. With this relative movement, the taper faces of the lance displacing projection molding part 47 press the lance displacing projection 18, and the free end side of the locking lance 15 is flexed outward to intrude into the lance flexing space 41 in the second core member 35. Accordingly, the lance displacing projection 18 is separated from the lance displacing projection molding part 47. Then, the locking projection molding part 45 is butted against the lance displacing projection 18 which has been separated from the lance displacing projection molding part 47. As the lance displacing projection 18 is displaced to intrude into the lance flexing space 41 in this manner, the locking projection molding part 45 of the third core member 37 is separated from the terminal locking projection 17. As the results, the whole free end side of the locking lance 15 comes into the state separated from the third core member 37.

Figure 4:
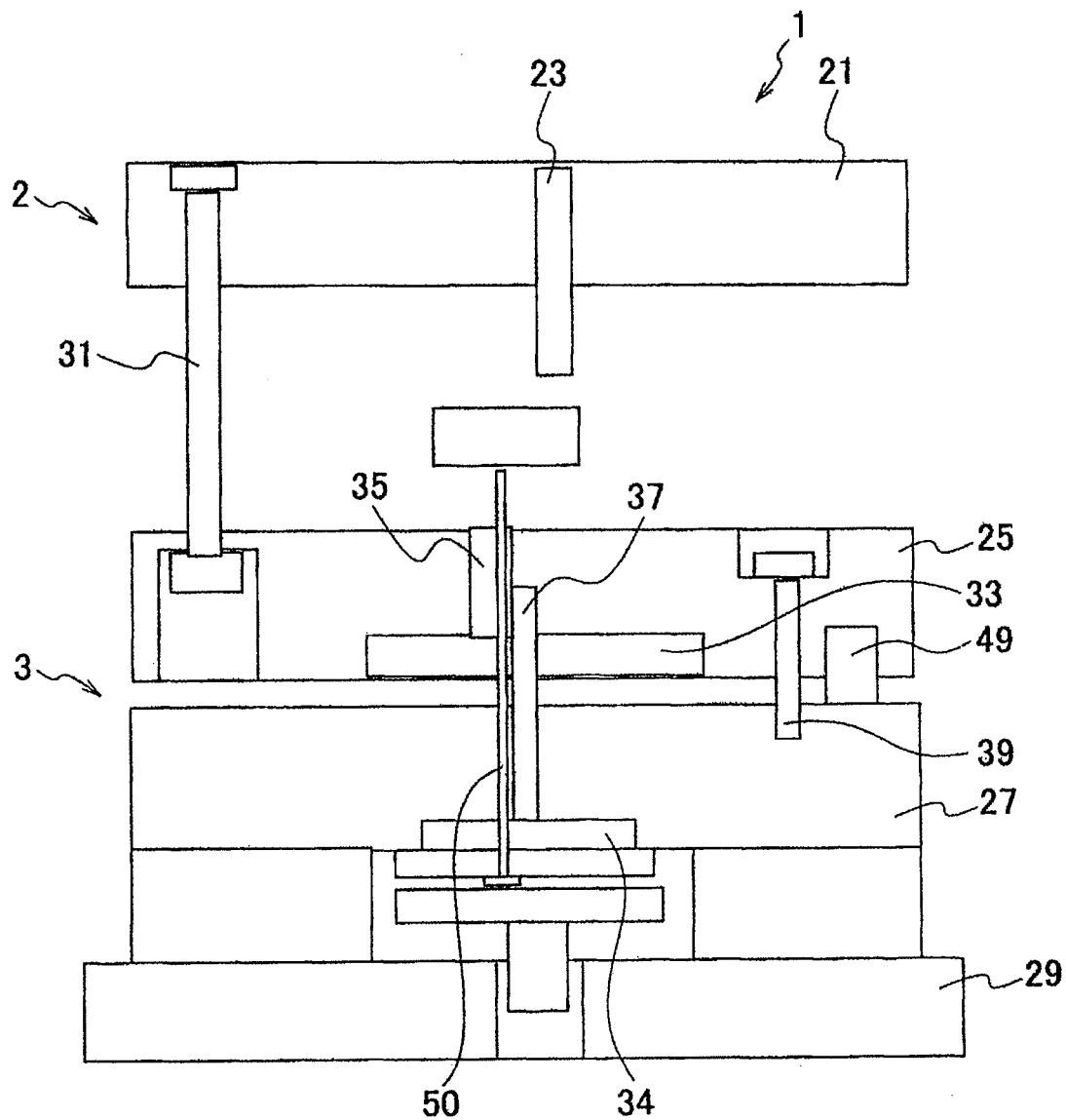
FIG. 4 is a sectional view showing a state where a housing as a product is being extruded from the molds.
Figure 5:
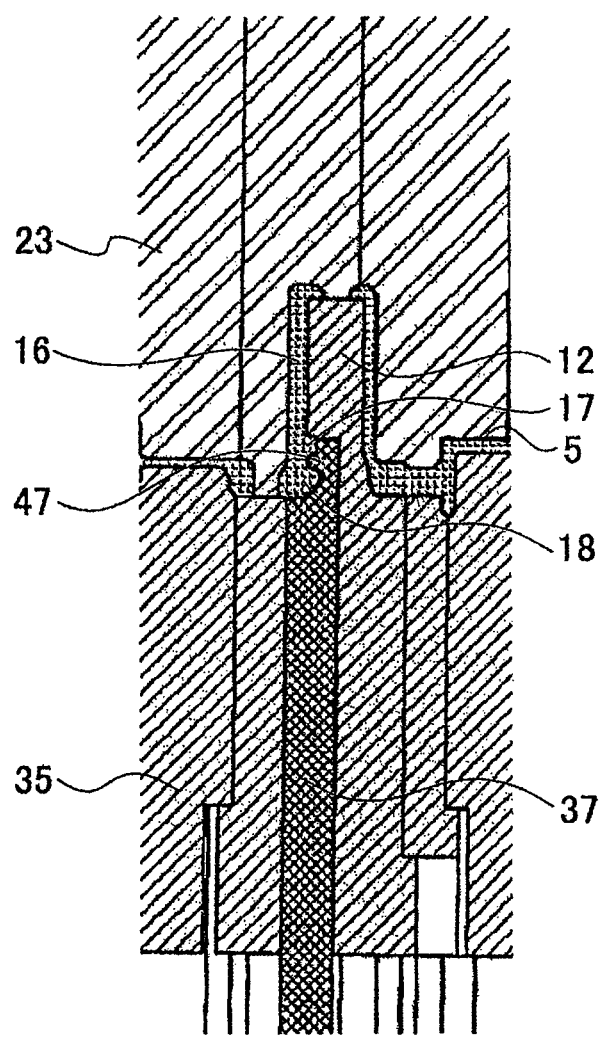
FIG. 5 is a sectional view showing a state where resin has been filled, in the mold structure in the embodiment according to the invention.

FIG. 4 and FIG. 8 show a state where the molds have been completely opened, continued from the further movement of the second core member 35 in the mold extracting direction as shown in FIG. 7. In this state, the housing 5 is extruded from the second core member 35 by means of a pushing pin 50, as a product.

According to the embodiment as described above, the following operation and effects can be achieved.

When the third core member 37 is moved with respect to the second core member 35, the lance displacing projection 18 is pressed with the third core member 37 thereby allowing the locking lance 15 to be flexed into the lance flexing space 41 in the second core member 35, and hence, the locking lance 15 will not be forcibly extracted. Therefore, the core member need not be divided in the lateral direction of the locking lance 15 for the purpose of avoiding forcible extraction. Besides, the core member need not be reduced in size, and hence, the rigidity of the core member can be secured. Moreover, the area of the terminal locking projection 17 need not be reduced, and hence, the terminal holding force can be sufficiently secured.

Moreover, when the third core member 37 is moved with respect to the second core member 35, the taper faces of the lance displacing projection molding part 47 press the lance displacing projection 18, and the locking projection molding part 45 of the third core member 37 is separated from the terminal locking projection 17. Consequently, the locking lance 15 can be flexed into the lance flexing space 41, and forcible extraction of the locking lance 15 is avoided.

FIGS. 9 to 13 show the housing 5 which has been molded according to the molding method in this embodiment. In these drawings, the housing 5 is shown upside down so as to correspond to FIGS. 5 to 8 in directivity.

Figure 12:
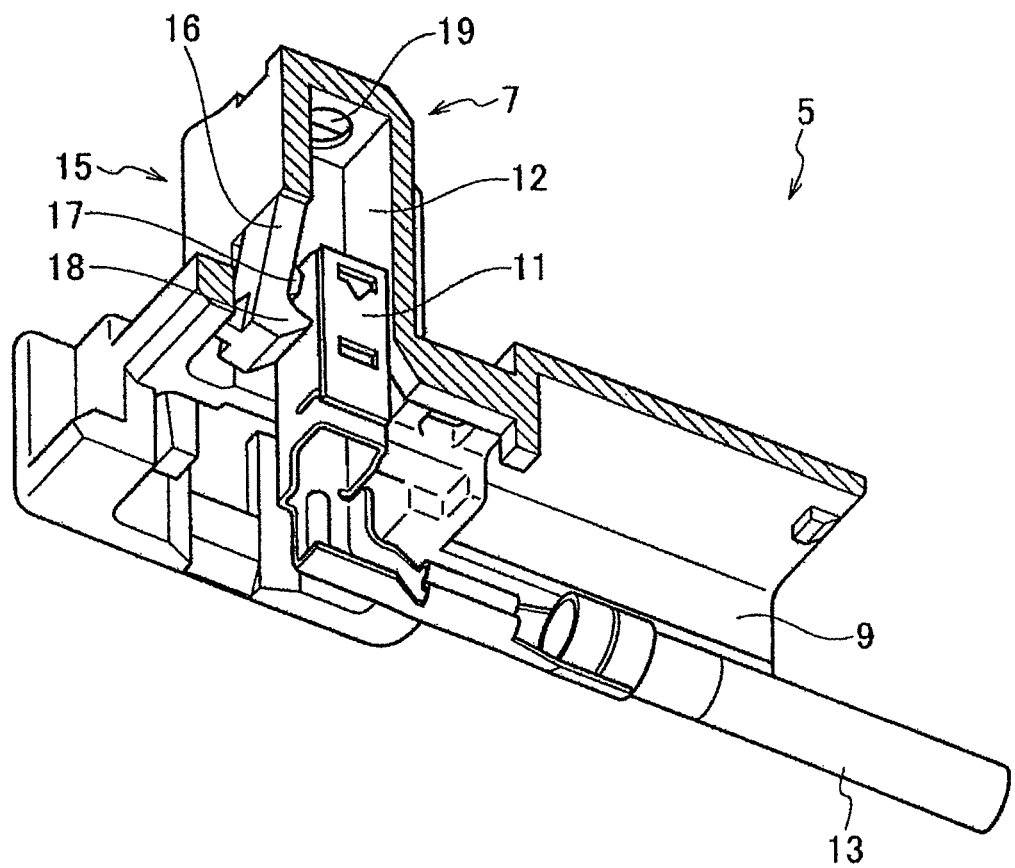
FIG. 12 is a perspective view partly in section showing a state where the terminal is being inserted into the terminal containing room.

In the wire end holding part 9 of the housing 5, an electric wire 13 having a terminal 11 coupled to its end portion is disposed. The terminal 11 is formed in a rectangular tubular shape, and adapted to be inserted into the terminal containing room 12 in the housing body 7. A mating terminal insertion hole 19 into which a mating terminal is to be inserted is formed on a distal end face of the terminal containing room 12. When the terminal 11 is inserted into the terminal containing room 12, the lance displacing projection 18 comes into contact with an outer face of the terminal 11, as shown in FIG. 12, and the locking lance 15 is flexed to retreat from the terminal 11. Accordingly, the insertion of the terminal 11 can be smoothly performed.

Figure 13:
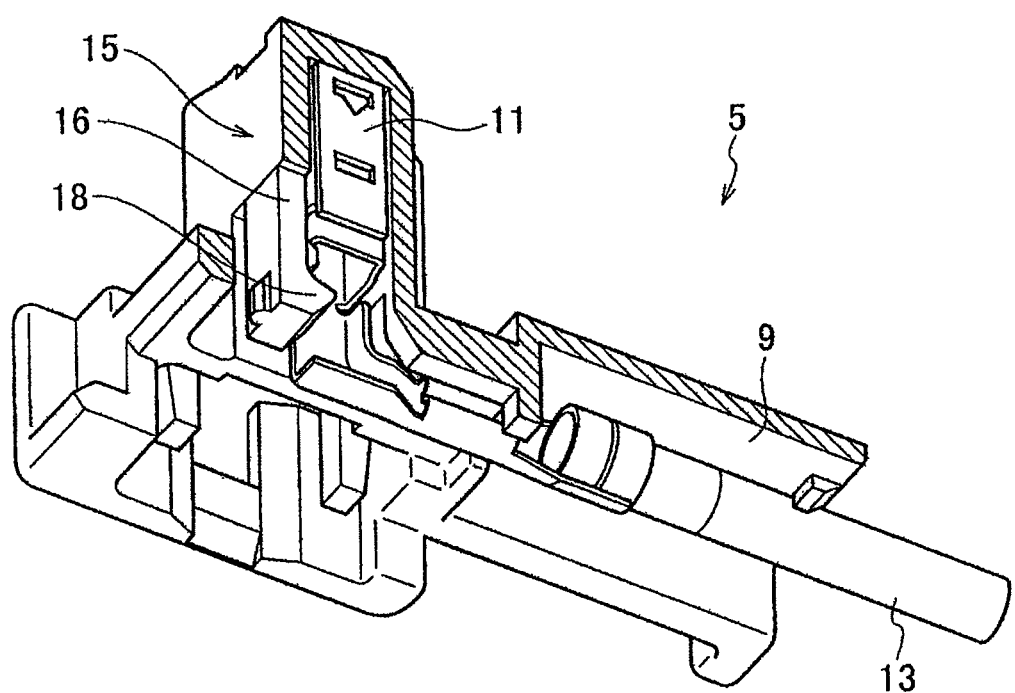
FIG. 13 is a perspective view partly in section showing a state where the terminal has been inserted into the terminal containing room.

FIG. 13 shows a state where the terminal 11 has been inserted into the terminal containing room 12. When the insertion of the terminal 11 into the terminal containing room 12 has been completed, the lance displacing projection 18 is disengaged from the contact with the terminal 11, and the locking lance 15 is restored to the original state by its elasticity. With this restoration, the terminal locking projection 17 is engaged with the terminal 11 thereby to prevent withdrawal of the terminal 11. On this occasion, the locking lance 15 interferes with the terminal 11, and an interfering sound occurs. Therefore, it is possible to confirm by the sound that the terminal has been locked.

Figure 10:
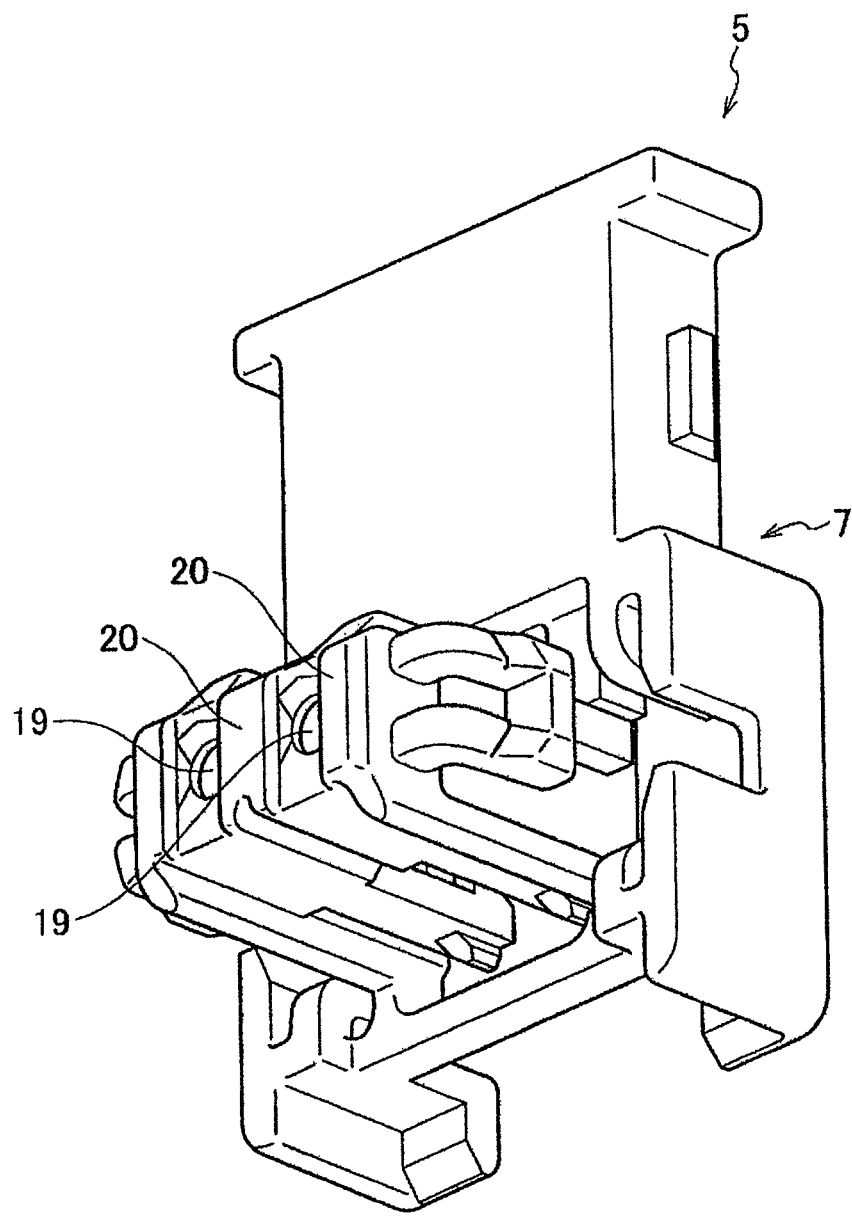
FIG. 10 is a perspective view of the housing.
Figure 11:
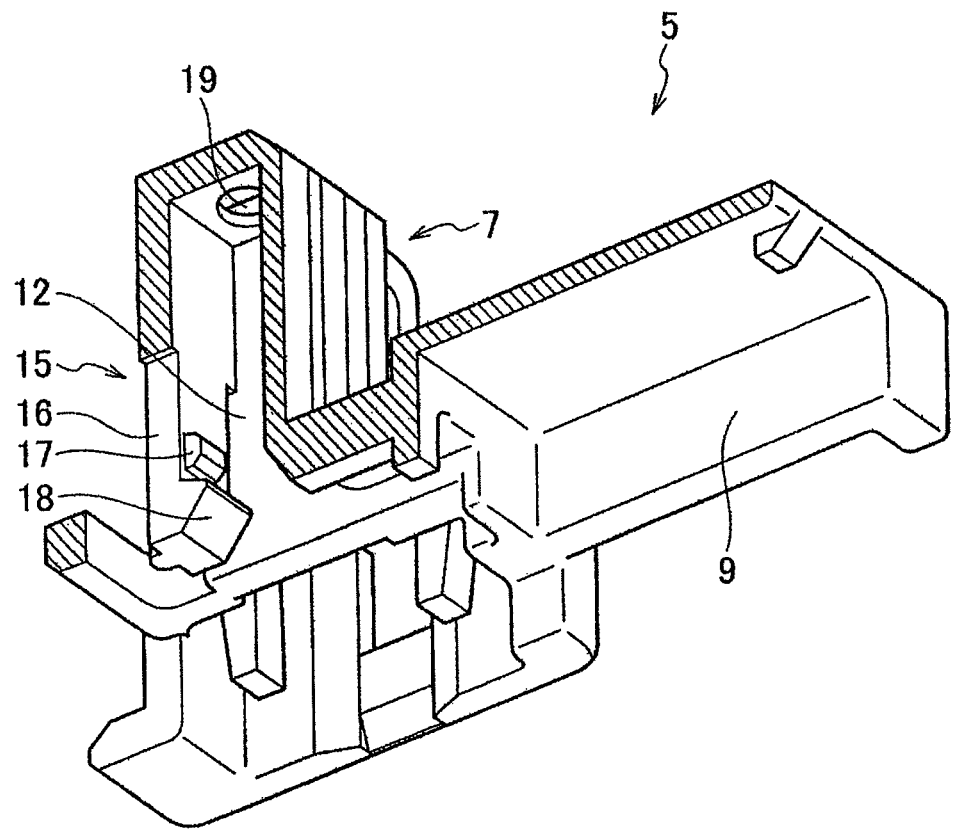
FIG. 11 is a perspective view partly in section showing a part including a terminal containing room in the housing.

FIG. 10 shows the housing 5, in which engagement butting faces 20 to which a mating connector is to be butted are formed on outer faces of the respective terminal containing rooms 12.

In the housing 5 having the above described structure, the terminal locking projection 17 is positioned inside the terminal containing room 12, and there is no necessity of forming the terminal locking projection 17 on the engagement butting face 20. Accordingly, the engagement butting face 20 need not be made larger, and hence, the housing 5 can be downsized.

According to the embodiment as described above, when the third core member 37 is moved with respect to the second core member 35 after the molds have been opened, whereby the lance displacing projection 18 is pressed with the third core member 37. With this pressing operation, the locking lance 15 is flexed into the lance flexing space 41 in the second core member 35, and hence, the locking lance 15 will not be forcibly extracted.

According to the embodiment as described above, the locking lance can be separated, even though the core member is not divided in the lateral direction of the locking lance. Therefore, the core member need not be reduced in size, and hence, the rigidity of the core member can be secured. Besides, the area of the terminal locking projection need not be reduced, and hence, it is possible to sufficiently secure the terminal holding force.

According to the embodiment as described above, the terminal locking projection 17 is molded between the locking projection molding part 45 of the third core member 37 and the first core member 23, and the lance displacing projection 18 is molded between the lance displacing projection molding part 47 and the first core member 23. As the results, it is possible to reliably mold the terminal locking projection and the lance displacing projection.

According to the embodiment as described above, after the lance displacing projection 18 has been molded between the first core member 23 and the third core member 37, the third core member 37 is moved with respect to the second core member 35, and presses the lance displacing projection 18, thereby allowing the locking lance 15 to be flexed into the lance flexing space 41 in the second core member 35. Accordingly, the locking lance will not be forcibly extracted. In this method, because the locking lance can be separated, even though the core member is not divided in the lateral direction of the locking lance, the core member need not be reduced in size, and hence, the rigidity of the core member can be secured. Besides, the area of the terminal locking projection need not be reduced, and hence, it is possible to sufficiently secure the terminal holding force.

According to the embodiment as described above, when the third core member 37 is moved with respect to the second core member 35, the lance displacing projection molding part 47 presses the lance displacing projection 18. With this pressing operation, the locking projection molding part 45 of the third core member 37 is separated from the terminal locking projection 17, thus enabling the locking lance 15 to be flexed into the lance flexing space 41, and the locking lance 15 will not be forcibly extracted.

According to the embodiment as described above, the lance displacing projection 18 which is formed in the flexible arm 16 of the locking lance 15 is pressed at a time of separating from the molds, and the whole flexible arm 16 is flexed. Therefore, the locking lance 15 need not be forcibly extracted. For this reason, there is no necessity of dividing the core member for separating, and the rigidity of the core member can be secured.

Moreover, according to the embodiment as described above, the separating from the molds can be conducted by allowing the lance displacing projection 18 to be flexed, and there is no necessity of reducing the area of the terminal locking projection, nor necessity of dividing the terminal locking projection. Accordingly, it is possible to sufficiently secure the terminal holding force of the locking lance.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

The disclosures of Japanese Patent Application No. 2009-105189 filed Apr. 23, 2009 including specification, drawings and claims is incorporated herein by reference in its entirety.

What is claimed is:

1. A method for molding a housing having a lance, the lance having a first projection for engaging a terminal and a second projection provided at a position nearer with an end of the lance than the first projection, comprising:
   providing a mold including:
      a first mold including a first member having a third projection; and a second mold including:
      a second member having a first concave portion into which the third projection is inserted; and
      a third member configured to be moved with respect to the second member, wherein the second member defines, with the first member, a first space where the housing is adapted to be formed,
      wherein the third member defines, with the first member, a second space where the first projection and the second projection are adapted to be formed; and
      wherein the second member extends further than the third member;
   filling a material between the first mold and the second mold; dividing the first mold and the second mold;
   displacing the third member with respect to the second member, so that the lance is bent, by urged from the third member at the second projection, into a space where the third projection of the first member has occupied before the dividing; and
   separating the housing from the second member in a state that the lance is bent into the space.

2. The method as set forth in claim 1, wherein:
the third member has a first part configured to form the first projection with the first member and a second part configured to form the second projection with the first member,
when the third member is displaced with respect to the second member, the second part urges the second projection so that the first part is allowed to be separated from the first projection.

* * * * *